(12) United States Patent
Kas et al.

(10) Patent No.: US 9,994,972 B2
(45) Date of Patent: Jun. 12, 2018

(54) METHOD FOR THE PREPARATION OF FIBERS FROM A CATALYST SOLUTION, AND ARTICLES COMPRISING SUCH FIBERS

(71) Applicant: Merck Patent GmbH, Darmstadt (DE)

(72) Inventors: Onur Kas, Waltham, MA (US); Gabriel Tkacik, Bedford, MA (US); Ashley Moore, Darmstadt (DE); Ryan Sylvia, Tewksbury, MA (US)

(73) Assignee: MERCK PATENT GMBH, Darmstadt (DE)

( * ) Notice: Subject to any disclaimer, the term of this patent is extended or adjusted under 35 U.S.C. 154(b) by 124 days.

(21) Appl. No.: 15/120,161

(22) PCT Filed: Jan. 19, 2015

(86) PCT No.: PCT/EP2015/000087
§ 371 (c)(1),
(2) Date: Aug. 19, 2016

(87) PCT Pub. No.: WO2015/124251
PCT Pub. Date: Aug. 27, 2015

(65) Prior Publication Data
US 2017/0073843 A1 Mar. 16, 2017

Related U.S. Application Data

(60) Provisional application No. 61/942,497, filed on Feb. 20, 2014, provisional application No. 61/988,514, filed on May 5, 2014, provisional application No. 61/989,724, filed on May 7, 2014.

(51) Int. Cl.
| | |
|---|---|
| *D01D 5/00* | (2006.01) |
| *D01F 1/10* | (2006.01) |
| *D01F 6/16* | (2006.01) |
| *H01M 4/92* | (2006.01) |
| *H01M 8/1018* | (2016.01) |
| *H01M 4/86* | (2006.01) |
| *H01M 4/88* | (2006.01) |
| *H01M 4/90* | (2006.01) |
| *H01M 8/1004* | (2016.01) |
| *C09D 11/52* | (2014.01) |
| *C09D 11/10* | (2014.01) |
| *D04H 1/728* | (2012.01) |
| *C09D 11/03* | (2014.01) |
| *C09D 11/106* | (2014.01) |
| *D01F 6/26* | (2006.01) |
| *D04H 1/4318* | (2012.01) |

(52) U.S. Cl.
CPC .......... *D01D 5/003* (2013.01); *C09D 11/03* (2013.01); *C09D 11/10* (2013.01); *C09D 11/106* (2013.01); *C09D 11/52* (2013.01); *D01D 5/0069* (2013.01); *D01F 1/10* (2013.01); *D01F 6/16* (2013.01); *D01F 6/26* (2013.01); *D04H 1/4318* (2013.01); *D04H 1/728* (2013.01); *H01M 4/8605* (2013.01); *H01M 4/8663* (2013.01); *H01M 4/8668* (2013.01); *H01M 4/881* (2013.01); *H01M 4/8825* (2013.01); *H01M 4/8853* (2013.01); *H01M 4/9041* (2013.01); *H01M 4/9075* (2013.01); *H01M 4/9083* (2013.01); *H01M 4/926* (2013.01); *H01M 8/1004* (2013.01); *H01M 8/1018* (2013.01); *H01M 2008/1095* (2013.01)

(58) Field of Classification Search
None
See application file for complete search history.

(56) References Cited

U.S. PATENT DOCUMENTS

| 2013/0209913 A1 | 8/2013 | Pintauro et al. |
| 2017/0250431 A1* | 8/2017 | Pintauro ............. H01M 8/1004 |

FOREIGN PATENT DOCUMENTS

| CN | 102054990 A | 5/2011 |
| CN | 103441287 A | 12/2013 |
| WO | 2012/058425 A2 | 5/2012 |

OTHER PUBLICATIONS nternational Search Report dated May 11, 2015 issued in corresponding PCT/EP2015/000087 application (5 pages).
Witten Opinion of the International Searching Authority dated May 11, 2015 issued in corresponding PCT/EP2015/000087 application (7 pages).
M. Brodt et al., "Nanofiber Fuel Cell Electrodes I. Fabrication and Performance with Commercial Pt/C Catalysts", ECS Transactions, vol. 58, No. 1 (2013) XP055186987.
H.S. Thiam et al., "Nafion/Pd-SiO2 Nanofiber Composite Membranes for Direct Methanol Fuel Cell Applications", International Journal of Hydrogen Energy, vol. 38, No. 22 (2013) pp. 9474-9483.
S. Agarwal et al., "Functional Materials by Electrospinning of Polymers", Progress in Polymer Science, vol. 38, No. 6 (2013) pp. 963-991.
English Abstract of CN 102054990 A published May 11, 2011 (1 page).
English Abstract of CN 103441287 A published Dec. 11, 2013 (2 pages).

* cited by examiner

Primary Examiner — Ladan Mohaddes
(74) Attorney, Agent, or Firm — Millen, White, Zelano, Branigan, P.C.

(57) ABSTRACT

The present invention relates to a method for the preparation of fibers from a catalyst solution by electrospinning and further to articles comprising such fibers.

16 Claims, 4 Drawing Sheets

METHOD FOR THE PREPARATION OF FIBERS FROM A CATALYST SOLUTION, AND ARTICLES COMPRISING SUCH FIBERS

TECHNICAL FIELD

The present invention relates to a method for the preparation of fibers from a catalyst solution by electrospinning and further to articles comprising such fibers.

BACKGROUND AND DESCRIPTION OF THE PRIOR ART

Proton exchange membrane fuel cells show great potential as future source of electrical energy. However, commercialization has been hindered by cost. Membrane electrode assembly (MEA) cost is a significant portion of the cost of the fuel cell stack and is dominated by platinum (Pt) cost, which is used as a catalyst. For the reduction of cost, it is necessary to reduce the required catalyst loading, for which an increase in catalytic activity, particularly for the oxygen reduction reaction at the cathode in a hydrogen/air fuel cell cathode, is necessary.

Significant increases in platinum utilization, and corresponding cost reduction, could be realized if a nanostructured electrode layer is employed, rather than a conventional painted or sprayed electrode. In WO 2012/058425, Pintauro and Zhang describe a nanostructured electrode layer prepared by electrospinning through a metallic needle. Higher performance for a nanofiber MEA with a platinum loading of 0.1 mg/cm$^2$ were reported at 524 mW/cm$^2$ as compared to 519 mW/cm$^2$ for a decal MEA with a platinum loading of 0.4 mg/cm$^2$. Nanofiber electrodes and their production by needle-based electrospinning are also disclosed in W. Zhang et al., ChemSusChem 2011, 4 (12), 1753-1757 and in M. Brodt et al., J. Electrochem. Soc. 2013, 160 (8), F744-F749.

Scaling up production on a needle-based electrospinning system is difficult for multiple reasons and does not lead to high enough fiber productivity for sufficient cost reductions.

It is therefore an object of the present application to provide a process that allows producing such nanofibers by electrospinning on a commercial scale.

It is also an object of the present application that such nanofibers may be produced with consistent and reproducible properties.

Further, it is an object of the present application that such nanofibers are suitable for use as electrode materials in fuel cell applications.

Additional objects become evident from the following description as well as the examples illustrating the present invention.

SUMMARY OF THE INVENTION

The present inventors have now surprisingly found that the above objects may be attained either individually or in any combination by the process of the present application.

Hence, the present application provides for a process of producing an electrospun fibrous mat, said process comprising the steps of
(a) preparing an electrospinning ink comprising metal supported on a carrier, an ionomer, an electrospinning polymer and a solvent by mixing; and
(b) electrospinning in electrospinning equipment said electrospinning ink to obtain the electrospun fibrous mat, wherein step (b) is performed by nozzle-free electrospinning.

Furthermore the present application provides for an electrospun fibrous mat formed by said process, a membrane electrode assembly comprising said electrospun fibrous mat as well as a fuel cell comprising said membrane electrode assembly.

DETAILED DESCRIPTION OF THE INVENTION

Figure 1:
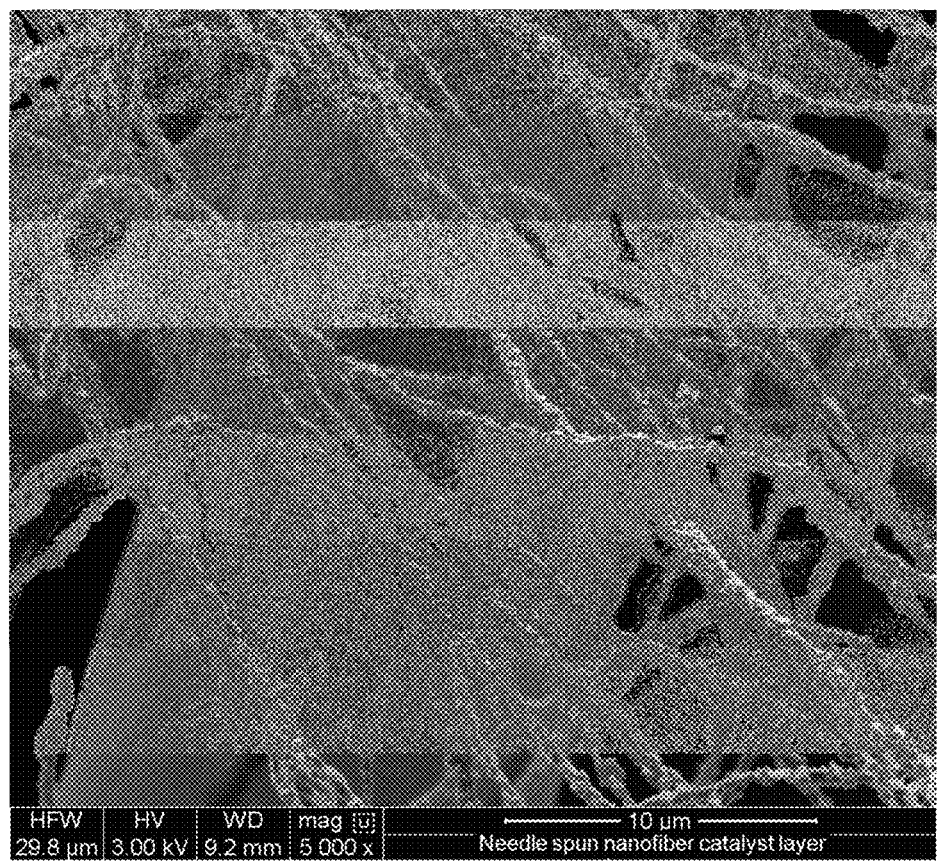
FIG. 1 shows a scanning electron microscope (SEM) image of the electrospun fibrous mat of Example 4.

For the purposes of the present application the term "nozzle-free electrospinning" is used to describe an electrospinning process where the Taylor cones, that result in spinning jets, form on a free surface, like the surface of a cylinder or a surface of a wire upon being coated by a polymer solution (as described in U.S. Pat. No. 7,585,437 issued to Jirsak et al.), as opposed to forming at the tip of a needle upon polymer solution injection or extrusion through that needle.

For the purposes of the present application the term "sccm" is used to denote "standard cubic centimeter per minute".

For the purposes of the present application the term "ionomer" is used to denote a polymer composed of macromolecules in which a small but significant proportion of the constitutional units has ionic or ionizable groups or both (see Pure and Applied Chemistry, Vol. 78, No. 11, pp. 2067-2074, particularly page 2071).

In basic terms, the present application provides for a process (or method) wherein first an electrospinning ink is prepared and secondly said electrospinning ink is electrospun in electrospinning equipment to obtain an electrospun fibrous mat.

The electrospinning ink used herein comprises metal supported on a carrier, an ionomer, an electrospinning polymer and a solvent.

While any metal that can be supported on a carrier may be used in the present process, it is nevertheless preferred that the metal is selected from the group consisting of Sc, Y, Ti, Zr, Hf, V, Nb, Ta, Cr, Mo, W, Fe, Ru, Os, Co, Rh, Ir, Ni, Pd, Pt, Cu, Ag, Au, Zn, Cd, Hg, lanthanides, actinides and any blend thereof. More preferably said metal may be selected from the group consisting of Co, Rh, Ir, Ni, Pd, Pt, Cu, Ag and Au. Even more preferably said metal may be selected from the group consisting of Ni, Pd, Pt, Cu, Ag and Au. Still even more preferably said metal may be selected from the group consisting of Ni, Pd and Pt. Most preferably said metal is Pt.

The carrier on which the metal is supported may be any inert material onto which metals can be supported. Suitable examples of such carriers may be selected from the group consisting of carbon, oxides, halides and blends thereof. Suitable oxides may for example be selected from the group consisting of alumina, magnesia, silica, and any blends of these. A suitable halide is for example magnesium chloride. The most preferred carrier on which the metal is supported is carbon.

The ionomer used herein may be described by formula (I)

wherein
A is an electrically neutral repeating unit;
B is an ionic or ionizable repeating unit;
a is at least 1 and at most 50;
b is 1; and
c is at least 5 and at most 10,000.

Preferred electrically neutral repeating units A may be represented by general formula —$CR^1R^2$—$CR^3R^4$—$(X^1)_d$— wherein $R^1$, $R^2$, $R^3$, $R^4$, $X^1$ and d are as defined below.

$R^1$, $R^2$, $R^3$ and $R^4$ are independently of each other selected from the group consisting of H, F, Cl, Br, I, alkyl having from 1 to 20 carbon atoms, aryl having from 6 to 10 carbon atoms and aryl having from 6 to 10 carbon atoms substituted with an alkyl having from 1 to 10 carbon atoms as well as analogous alkyl and aryl wherein one or more hydrogens are replaced by fluorine. More preferably $R^1$, $R^2$, $R^3$ and $R^4$ are independently of each other be selected from the group consisting of H, F, alkyl having from 1 to 10 carbon atoms, aryl having from 6 to 10 carbon atoms and aryl having from 6 to 10 carbon atoms substituted with an alkyl having from 1 to 10 carbon atoms as well as analogous alkyl and aryl wherein one or more hydrogens are replaced by fluorine. Even more preferably $R^1$, $R^2$, $R^3$ and $R^4$ are independently of each other be selected from the group consisting of H, F, methyl, ethyl and phenyl as well as the respective analogues of methyl, ethyl and phenyl wherein one or more hydrogens are replaced by fluorine. Most preferably $R^1$, $R^2$, $R^3$ and $R^4$ are F.

Examples of alkyl having from 1 to 10 carbon atoms are methyl, ethyl, n-propyl, i-propyl, n-butyl, i-butyl, s-butyl, t-butyl, 2-methylbutyl, n-pentyl, s-pentyl, cyclopentyl, neo-pentyl, n-hexyl, cyclohexyl, neo-hexyl, n-heptyl, cyclohep-tyl, n-octyl, cyclooctyl, 2-ethylhexyl, nonyl and decyl as well as the respective fluorinated analogues wherein one or more hydrogen is replaced by fluorine. Preferred examples of alkyl having from 1 to 10 carbon atoms are methyl, ethyl, n-propyl, i-propyl, s-butyl, n-pentyl and n-hexyl as well as the respective fluorinated analogues wherein one or more hydrogen is replaced by fluorine.

$X^1$ may be selected from the group consisting of O, S, $NR^5$ and $PR^5$, with $R^5$ being selected from the group consisting of H, alkyl having from 1 to 20 carbon atoms, aryl having from 6 to 10 carbon atoms and aryl having from 6 to 10 carbon atoms substituted with an alkyl having from 1 to 10 carbon atoms as well as analogous alkyl and aryl wherein one or more hydrogens are replaced by fluorine. Most preferably $X^1$ is O.

d may be 0 or 1. Preferably d is 0.

Preferred ionic or ionizable repeating units B may be represented by general formula —$(CR^6R^7)_e$—$(CR^8R^9)$— wherein $R^6$, $R^2$, $R^8$, $R^9$ and e are as defined below, $R^6$, $R^2$ and $R^8$ are independently of each other selected as defined above for $R^1$, $R^2$, $R^3$ and $R^4$.

e may be 0 or 1. Preferably e is 1.

$R^9$ may be represented by general formula —$(R^{10})_f$—$X^2$ wherein $R^{10}$, f and $X^2$ are as defined below.

f may be 0 or 1. Preferably f is 1.

$X^2$ may be —$SO_3H$ or —$PO_3H_2$. Preferably $X^2$ is —$SO_3H$.

$R^{10}$ is represented by general formula —$(X^3)_g$—$(R^{11})_h$—$(X^4)_i$—$(R^{12})_j$— with $X^3$, $X^4$, $R^{11}$, $R^{12}$, g, h, i and j as defined below.

$X^3$ and $X^4$ are independently of each other selected from the group consisting of O, S, $NR^5$ and $PR^5$, with $R^5$ as defined earlier. Preferably $X^3$ and $X^4$ are O.

g, h, I and j may independently of each other be at least 0 and at most 10, preferably at least 1 and at most 5.

$R^{11}$ and $R^{12}$ may be independently selected from the group consisting of alkandiyl having from 1 to 10 carbon atoms, arylene having from one to 6 to 10 carbon atoms and arylene having from 6 to 10 carbon atoms substituted with an alkyl having from 1 to 10 carbon atoms as well as analogous alkyl and aryl wherein one or more hydrogens are replaced by fluorine.

Examples of alkandiyl having from 1 to 10 carbon atoms are methylene (—$CH_2$—), ethanediyl, n-propanediyl, i-pro-panediyl etc. as well as the respective analogues wherein one or more hydrogen is replaced by a fluorine.

Particularly preferred are ionomers of general formula (II)

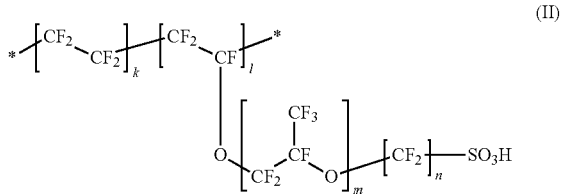

wherein k is at least 6 and at most 10, I is 1, m is 0 or 1 and n is at least 2 and at most 4. An example of such an ionomer is Nafion™, which is commercially available from DuPont.

Suitable solvents may be selected from the group consisting of water, ethers of general formula $R^{13}$—O—$R^{14}$, alcohols of general formula $R^{15}$—OH, ketones of general formula $R^{16}$—C(=O)—$R^{17}$, amides of general formula $(R^{16})_2N$—C(=O)—$R^{17}$ and any blends thereof, wherein $R^{13}$, $R^{14}$, $R^{15}$ and $R^{16}$ are independently of each other selected from alkyl having from 1 to 10 carbon atoms and fluorinated alkyl having from 1 to 10 carbon atoms, and $R^{17}$ is selected from the group consisting of H, alkyl having from 1 to 10 carbon atoms and fluorinated alkyl having from 1 to 10 carbon atoms, or $R^{13}$ and $R^{14}$ may together be selected from alkanediyl having from 4 to 6 carbon atoms and fluorinated alkanediyl having from 4 to 6 carbon atoms, or $R^{16}$ and $R^{17}$ may together be selected from alkanediyl having from 4 to 6 carbon atoms and fluorinated alkanediyl having from 4 to 6 carbon atoms. With respect to $R^{13}$, $R^{14}$, $R^{15}$, $R^{16}$ and $R^{17}$ the term "fluorinated" means that at least one hydrogen is replaced by fluorine.

Examples of particularly suited ethers are dimethylether, ethylmethylether, diethylether, butylethylether, diisoproyle-ther, tetrahydrofurane, the respective fluorinated analogues and any blend of these.

Examples of particularly suited alcohols are methanol, ethanol, n-propanol, i-propanol, 1-butanol, 2-butanol, 2-methyl-1-propanol, 1-pentanol, 2-pentanol, 3-pentanol, 2-methyl-1-butanol, 2-methyl-2-butanol, 3-methyl-1-buta-nol, 3-methyl-2-butanol, the respective fluorinated analogues and any blends of these. Preferred examples are methanol, ethanol, n-propanol, i-propanol, the respective fluorinated analogues and any blends of these. Most preferred examples are n-propanol, i-propanol and any blend of these.

Examples of particularly suited ketones are acetone, 2-butanone (ethylmethylketone), 2-pentanone, 3-pentanone, 2-hexanone, 3-hexanone, 4-hexanone, 2-ocatanone, 3-octanone, 4-octanone, acetophenone, the respective fluorinated analogues and any blend of these. The most preferred ketone is acetone.

Examples of particularly suited amides are N,N-dimethylformamide ("DMF") and N,N-dimethylacetamide ("DMAc").

Preferably said solvent comprises water and an alcohol of general formula $R^{15}$—OH as defined above. More preferably said solvent consists of water and an alcohol of general formula $R^{15}$—OH as defined above.

The choice of electrospinning polymer is not particularly limited. In principle all electrospinnable polymers which are well known to the skilled person may be used as electrospinning polymer. Suitable examples of electrospinning polymers may be selected from the group consisting of poly(acrylic acid), polymethacrylate, polyamide, polyimide, polyurethane, polybenzimidazole, polycarbonate, polyacrylonitrile, poly(vinyl alcohol), poly(lactic acid), polyethylene oxide, polystyrene, polyaniline, polyethylene terephthalate, polybutylene terephthalate, poly(acryl amide), polycaprolactone, poly(vinylidene fluoride), poly(ethylene co-vinyl alcohol), polysulfone (PSU), polyethersulfone (PES), and any blends of these. Of these poly(acrylic acid) has been found to give particularly good results.

An electrospinning polymer may be added for a number of reasons. For example, the addition of an electrospinning polymer may be used to change the viscosity of the electrospinning ink, which in turn influences the formation of fibers in the electrospinning process. The addition of an electrospinning polymer may also help in improving the spinnability of an electrospinning ink that is otherwise difficult to spin because its components do not lend themselves well to electrospinning.

The present electrospinning inks are prepared by mixing the respective components of the electrospinning ink. Such mixing may for example be performed by ball milling, magnetic stirring, mechanical stirring, shaking, sonication, homogenization or any method making use of more than one of these. The choice in mixing method may depend upon the nature of the compositions to be mixed. For example it might be useful to mix by ball milling if the metal supported on the carrier is present in bigger particles, which need to be reduced in size. Sonication and magnetic stirring and a combination of both, possibly several repeat intermittent cycles of sonication and magnetic stirring have proven to be particularly useful.

The duration of mixing is not particularly limited and may also depend upon the nature of the respective composition. For example the duration of mixing may be chosen in the range from a few seconds to one week or even longer. It may for example be at least 1 s, 5 s 10 s, 30 s, 1 min, 5 min, 10 min, 30 min, 1 h, 2 h, 3 h, 4 h, 5 h, 6 h, 9 h, 12 h, 15 h, 18 h, 21 h, 1 day, 2 days, 3 days, 4 days, 5 days, 6 days, 7 days or even longer. Preferably said mixing time may be at least 12 h, 15 h, 18 h, 21 h, 1 day, 2 days, 3 days, 4 days, 5 days, 6 days, 7 days or even longer. More preferably said mixing time is at least 1 day, 2 days, 3 days, 4 days, 5 days, 6 days, 7 days or even longer. Even more preferably said mixing time is at least 2 days, 3 days, 4 days, 5 days, 6 days, 7 days or even longer.

As an alternative to room temperature the mixing may also be performed at higher or lower temperature. The choice in temperature may also depend on the nature of the respective composition to be mixed and may for example be chosen based on the miscibility and/or solubility and/or thermal stability of the components of the composition to be mixed.

Preferably the electrospinning ink comprises at least 1 wt % (for example at least 1 wt % or 2 wt % or 3 wt % or 4 wt % or 5 wt %) of the combined fractions of metal with carrier, ionomer and electrospinning polymer, with wt % being relative to the total weight of electrospinning ink.

Preferably the electrospinning ink comprises at most 30 wt % (for example at most 25 wt % or 20 wt % or 19 wt % wt % or 18 wt % or 17 wt % or 16 wt % or 15 wt % or 14 wt % or 13 wt % or 12 wt % or 11 wt % or 10 wt % or 9 wt % or 8 wt %) of the combined amounts of metal with carrier, ionomer and electrospinning polymer, with wt % being relative to the total weight of the electrospinning ink.

Preferably the electrospinning ink comprises metal with carrier, ionomer and electrospinning polymer in a ratio of A:B:C, wherein A i.e. metal together with carrier, is at least 10 parts and at most 80 parts, for example at least 12 or 14 or 16 or 18 or 20 or 22 or 24 or 26 or 28 or 30 or 32 or 34 or 36 or 38 or 40 or 42 or 44 or 46 or 48 or 50 parts, and for example at most 80 or 78 or 76 or 74 or 72 or 70 parts;

B is at least 1 part and at most 40 parts, for example at least 2 or 3 or 4 or 5 or 6 or 7 or 8 or 9 or 10 or 11 or 12 or 13 or 14 or 15 parts, and for example at most 38 or 36 or 34 or 32 or 30 parts; and C is at most 50 parts, for example at most 48 or 46 or 44 or 42 or 40 or 38 or 36 or 34 or 32 or 30 or 28 or 26 or 24 or 22 or 20 or 18 or 16 or 14 or 12 or 10 or 8 or 6 or 4 or 2 or 1.5 or 1 or 0.5 or 0.1 or 0.01 or 0.001 parts, provided that the sum of A, B and C is 100 parts, with parts being given in weight percent relative to the total weight of the catalyst (metal with carrier), ionomer and electrospinning polymer.

The so-obtained electrospinning ink is electrospun in electrospinning equipment to obtain the electrospun fibrous mat.

The preparation of the electrospinning ink is to be performed at most 12 hours, for example at most 6 hours, at most 4 hours, at most 2 hours, at most 1.5 hours, at most 1 hour, at most 45 min, at most 30 min, at most 20 min, at most 15 min, at most 10 min, at most 5 min before the electrospinning. The minimum time between said preparation of the electrospinning ink and the electrospinning is determined by the time it takes to transfer the electrospinning ink into the electrospinning equipment and start electrospinning, for example at least 10 s, 30 s or 1 min. Generally stated it is preferred that the time between the preparation of the electrospinning ink (i.e. the end of the preparation process) and the start of electrospinning is as short as possible.

The electrospinning equipment used in the present invention is a so-called nozzle-free electrospinning equipment. The term "nozzle-free" is to denote that the electrospinning ink is not passed through a needle.

In a nozzle-free electrospinning process the electrospinning ink is generally placed in a bath, into which a rotating drum or alternatively a rotating wire electrode is dipped. A fine layer of electrospinning ink is carried by the rotating drum or wire electrode and exposed to an electric field which is established between high voltage source and ground electrode, or an oppositely charged source. Due to the electric field a number of jets of electrospinning ink are generated and collected on a moving collecting belt, which is preferably placed between rotating drum or wire electrode and ground electrode so as to result in an electrospun fibrous mat.

Nozzle-free electrospinning process and the respective equipment are for example disclosed in WO 2005/024101, WO 2006/131081, and WO 2008/106903, all assigned to Elmarco S.R.O. (Liberec, Czech Republic), a commercial supplier of nozzle-free electrospinning equipment.

Electrospinning parameters may depend upon the nature and properties of the electrospinning ink. The determination of such electrospinning parameters is, however, well within the capabilities of the skilled person.

It is preferred that the distance between the surface of the bath (10), where the electrospinning ink is kept, and the moving collecting belt is at least 0.01 m and at most 2 m. Said distance may for example be at least 0.05 m or 0.1 m or 0.2 m or 0.3 m or 0.4 m or 0.5 m. Said distance may for example be at most 1.9 m or 1.8 m or 1.7 m or 1.6 m.

It is preferred that the electrospinning process is performed at an applied voltage of at least 1.0 kV and of at most 200 kV. Said applied voltage may for example be at least 2.0 kV or 3.0 kV or 4.0 kV or 5.0 kV or 10 kV. Said applied voltage may for example be at most 150 kV or 100 kV or 90 kV or 80 kV or 70 kV.

In one aspect of the present invention, any of a variety of porous single or multilayered substrates or supports can be arranged on the moving collecting belt to be and combined with the electrospun fibrous mat, thereby forming a composite.

Examples of single or multilayered porous substrates or supports include, but are not limited to, spunbonded nonwovens, meltblown nonwovens, needle punched nonwovens, spunlaced nonwovens, wet laid nonwovens, resin-bonded nonwovens, woven fabrics, knit fabrics, apertured films, paper, and combinations thereof.

In another aspect of the present invention the present electrospun fibrous mat may be bonded to a porous substrate or support. Bonding may be accomplished by known methods in the art, including but not limited to thermal calendering between heated smooth nip rolls, ultrasonic bonding, and through gas bonding. Bonding increases the strength and the compression resistance of the medium so that the medium may withstand the forces associated with being handled, being formed into a useful device, and depending on the bonding method used, may result in the adaptation of physical properties such as thickness, density, and the size and shape of the pores.

For instance, thermal calendering can be used to reduce the thickness and increase the density and reduce the porosity of the electrospun nanofiber mat medium, and reduce the size of the pores. This in turn decreases the flow rate through the medium at a given applied differential pressure. In general, ultrasonic bonding will bond to a smaller area of the electrospun nanofiber mat medium than thermal calendering, and therefore has a lesser effect on thickness, density and pore size. Though gas bonding generally has minimal effect on thickness, density and pore size, therefore this bonding method may be preferable in applications in which maintaining higher fluid flow rate is desired.

When thermal calendering is used, care must be taken not to over-bond the electrospun fibrous mat, such that the nanofibers melt and no longer retain their structure as individual fibers. In the extreme, over-bonding would result in the nanofibers melting completely such that a film would be formed. One or both of the nip rolls used is heated to a temperature of between about ambient temperature, e.g., about 25° C., and about 300° C. The fibrous mat(s) and/or porous support or substrate, can be compressed between the nip rolls at a pressure ranging from about 0 lb/in to about 1000 lb/in (178 kg/cm). The nanofiber mat(s) can be compressed at a line speed of at least about 10 ft/min (3 m/min).

Calendering conditions, e.g., roll temperature, nip pressure and line speed, can be adjusted to achieve the desired solidity. In general, application of higher temperature, pressure, and/or residence time under elevated temperature and/or pressure results in increased solidity.

Other mechanical steps, such as stretching, cooling, heating, sintering, annealing, reeling, unreeling, and the like, may optionally be included in the overall process of forming, shaping and making the electrospun fibrous mat as desired.

For example, the present electrospun fibrous mat may be stretched in a single step or a plurality of steps as desired. Depending on the stretching method used to stretch the electrospun fibrous mat, stretching can adjust the physical properties of the mat including thickness, density, and the size and shape of the pores formed in the mat. For example, if the electrospun fibrous mat is stretched in a single direction (uniaxial stretching), the stretching may be accomplished by a single stretching step or a sequence of stretching steps until the desired final stretch ratio is attained.

Similarly, if the electrospun fibrous mat is stretched in two directions (biaxial stretching), the stretching can be conducted by a single biaxial stretching step or a sequence of biaxial stretching steps until the desired final stretch ratios are attained. Biaxial stretching may also be accomplished by a sequence of one or more uniaxial stretching steps in one direction and one or more uniaxial stretching steps in another direction. Biaxial stretching steps where the electrospun fibrous mat is stretched simultaneously in two directions and uniaxial stretching steps may be conducted in sequence in any order.

Methods for stretching the electrospun fibrous mat are not particularly limited, and use may be made of ordinary tentering, rolling, or inflation or a combination of two or more of these. The stretching may be conducted uniaxially, biaxially, etc. In the case of biaxial stretching, machine-direction stretching and transverse-direction stretching may be conducted either simultaneously or successively.

Various types of stretching apparatus are well known in art and may be used to accomplish stretching of the electrospun fibrous mat according to the present invention. Uniaxial stretching is usually accomplished by stretching between two rollers wherein the second or downstream roller rotates at a greater peripheral speed than the first or upstream roller. Uniaxial stretching can also be accomplished on a standard tentering machine.

Biaxial stretching may be accomplished by simultaneously stretching in two different directions on a tentering machine. More commonly, however, biaxial stretching is accomplished by first uniaxially stretching between two differentially rotating rollers as described above, followed by either uniaxially stretching in a different direction using a tenter machine or by biaxially stretching using a tenter machine. The most common type of biaxial stretching is where the two stretching directions are approximately at right angles to each other. In most cases where a continuous sheet is being stretched, one stretching direction is at least approximately parallel to the long axis of the sheet (machine direction) and the other stretching direction is at least approximately perpendicular to the machine direction and is in the plane of the sheet (transverse direction).

After the electrospun fibrous mat has been stretched either uniaxially or biaxially, the stretched porous electrospun fibrous mat can again be calendered. The stretched electrospun fibrous mat can be forwarded to a pair of heated calender rolls acting cooperatively so as to form a mat of reduced thickness compared to the mat exiting from the stretching apparatus. By regulating the pressure exerted by these calendar rolls along with the temperature, the pore size of the final electrospun fibrous mat can be controlled as desired, thereby allowing for the adjustment of the average pore size.

The electrospun fibrous mat may be heated by any of a wide variety of techniques prior to, during, and/or after stretching. Examples of these techniques include radiative heating such as that provided by electrically heated or gas fired infrared heaters, convective heating such as that provided by re-circulating hot air, and conductive heating such as that provided by contact with heated rolls. The temperatures which are measured for temperature control purposes may vary according to the apparatus used and personal preference.

In general, the temperature or temperatures can be controlled such that the electrospun fibrous mat is stretched about evenly so that the variations, if any, in thickness of the stretched mat are within acceptable limits and so that the amount of stretched microporous electrospun fibrous mat outside of those limits is acceptably low. It will be apparent that the temperatures used for control purposes may or may not be close to those of the electrospun fibrous mat itself since they depend upon the nature of the apparatus used, the locations of the temperature-measuring devices, and the identities of the substances or objects whose temperatures are being measured.

In a subsequent step the electrospun fibrous mats, either as directly obtained from the electrospinning process or post-treated as described above, may be used as anode or cathode or both in a membrane electrode assembly.

Figure 4:
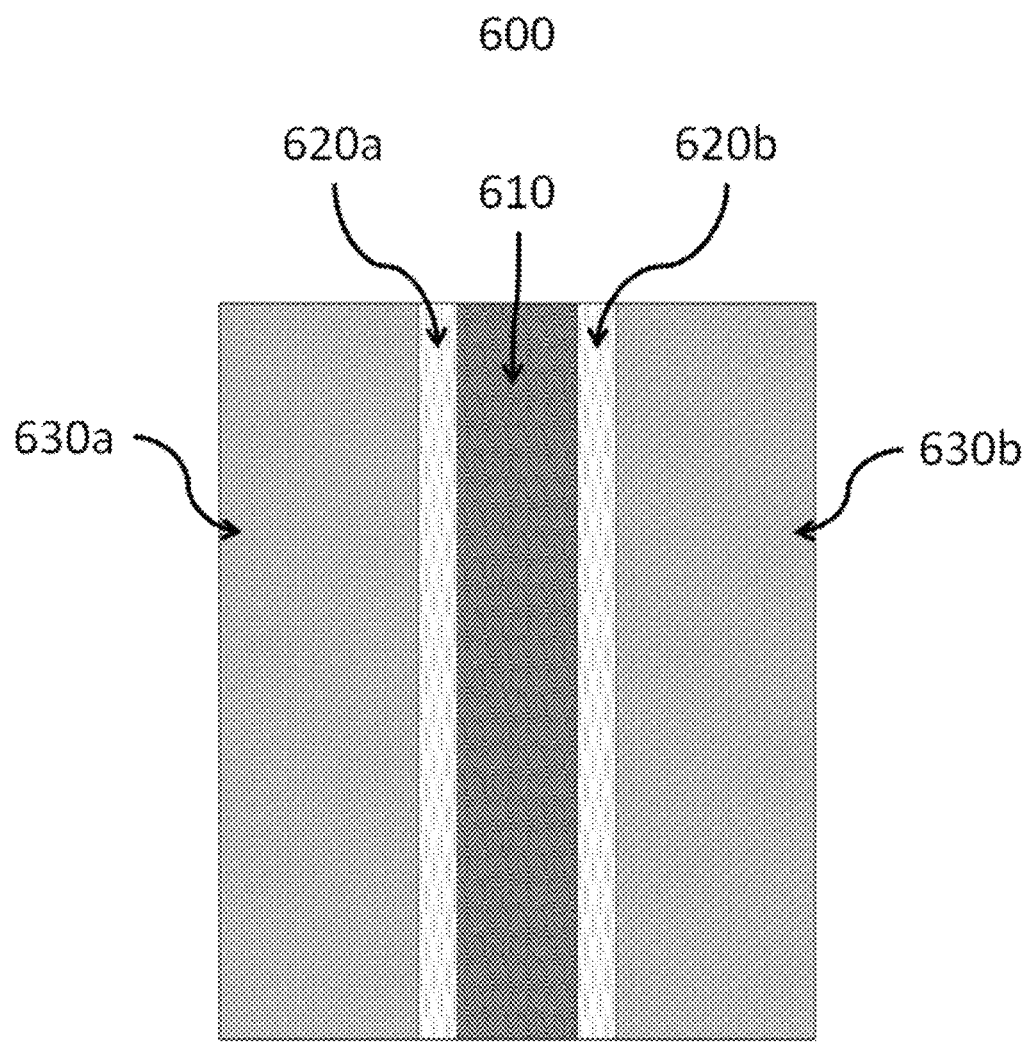
FIG. 4 shows a schematic representation of an exemplary membrane electrode assembly.

A schematic representation of a membrane electrode assembly (600), as is for example used in a fuel cell, such as for example a proton exchange membrane fuel cell, is shown in FIG. 4. A typical membrane electrode assembly for a fuel cell comprises two gas diffusion layers (GDL) (630a, 630b), with adjacent catalyst electrode layers (620a, 620b), cathode and anode. At the anode, a first catalyst layer helps in separating hydrogen into protons and electrons. The resulting protons then travel through proton exchange membrane (610) to the cathode, at which a second catalyst layer helps in combining the protons with oxygen and electrons to form water and heat. On either side, such membrane electrode assembly may further comprise a device, such as for example a flow-field plate, directing hydrogen to the anode and oxygen to the cathode.

Catalyst layers 620a and 620b may be the same or different. In an aspect of the present invention such catalyst layers comprise the electrospun fibrous mat in accordance with the present invention. As fuel cell catalyst frequently platinum is used.

The proton exchange membrane (610) may for example be produced from Nafion™.

Test Methods

Conductivity measurement method: Conductivity of ink samples was measured using a Mettler Toledo SevenCompact conductivity meter equipped with an InLab 731 conductivity probe. About 15 ml of solution was placed in a 20 ml jar and capped. The samples were then kept in a water bath at 25° C. for at least 30 min for temperature equilibration. The probe was then immersed in the jar and the ink conductivity data was collected.

Calculation of platinum loading: Platinum catalyst loading was calculated by multiplying the weight of the electrospun mat (determined from the weight of the electrode before and after electrospinning) by the weight fractions of Pt catalyst used in its preparation, and reported in $mg_{Pt}/cm^2$, assuming a homogeneous catalyst particle distribution within the fibrous mat.

Fiber diameter measurement: Fiber diameter was determined as follows: A scanning electron microscope (SEM) image was taken at 20,000 times magnification of each nanofiber mat sample. The diameters of at least ten (10) clearly distinguishable nanofibers were measured from each SEM image, recorded and averaged.

Electrochemical surface area determination: The active electrochemical surface area of the fuel cell cathode (working electrode) was determined by in-situ cyclic voltammetry in a fuel cell test fixture at 30° C. with fully humidified $H_2$ and $N_2$ flowing at the anode and cathode, respectively. Using a VersaSTAT 4 potentiostat (Princeton Applied Research, Oak Ridge, Tenn.), the voltage of the working electrode was cycled from 0.04 to 0.9 V (vs. SHE) at 100 mVs to remove surface oxides from the catalyst surface, and at 20 mVs for surface area calculation. The active surface area was determined by integrating the $H_2$ adsorption/desorption peaks of the curve, subtracting the double-layer capacitance, and averaging to obtain the hydrogen adsorption charge density ($q_H$, Coulomb/cm$^2$). The active surface area is calculated from the following equation:

$$ESA\left(\frac{m_{Pt}^2}{g_{Pt}}\right) = \frac{q_H}{\Gamma \cdot L}$$

where $\Gamma$ is the charge required to reduce a monolayer of protons onto a smooth Pt surface ($\Gamma$=210 $\mu C/cm^2_{Pt}$), and L is the catalyst loading of the electrode, in $g_{Pt}/m^2_{electrode}$.

Fuel cell performance evaluation: Single-cell performance was evaluated in a hydrogen/air fuel cell (5 cm$^2$ MEA) connected to an 850E test stand from Scribner Associates, Inc. (Southern Pines, N.C.). The cell temperature was maintained at 80° C. with no backpressure, with reagent gas flows of 125 sccm $H_2$ at the anode and 500 sccm air at the cathode, both at 80° C. and 100% RH (% relative humidity). Polarization curves were obtained by scanning voltage from 0.2 V to open-circuit voltage, with one minute of equilibration between recordings.

EXAMPLES

The following non-limiting examples are to further illustrate the advantages of the present invention.

Example 1

Preparation of Electrospinning Inks (General Procedure)

Electrospinning inks comprising approximately 63 wt % Pt/C, 22 wt % ionomer, and 15 wt % poly(acrylic acid) in alcohol/water solvent, with wt % relative to the total weight of the ink, were prepared by a mixing method similar to the one disclosed in J. Electrochem. Soc. 2013, 160(8), F744-F749. An amount of catalyst and an amount of de-ionized water are mixed for a total of 90 minutes by intermittent sonication and magnetic stirring. An amount of ionomer is added to the catalyst mixture, forming an ink, followed by iterations of sonication and magnetic stirring. Finally, electrospinning polymer solution and iso-propanol are added to the ink. Magnetic stirring is continued for approximately two days.

Example 2

Electrospinning Method (General Procedure)

Electrospinning was conducted on an NS LAB200, (Elmarco s.r.o. Liberec, CZ), electrospinning unit equipped with a low volume (ca. 25 ml) pan, a rotating wire spinning electrode and a wire collecting electrode. Electrospun fibrous mats were produced statically where the sample thickness is determined by spinning time. As a substrate conventional nonwovens were used for SEM samples (i.e. Hirose), and gas diffusion layers were used for fuel cell performance testing.

Example 3

Preparation of Membrane Electrode Assembly (General Procedure)

Two gas-diffusion electrodes (GDEs), consisting of layered carbon paper, a microporous layer and a catalyst layer, were arranged, with catalyst layers facing inward, on either side of a Nafion™ 211 membrane. The membrane electrode assembly was arranged between sheets of high-temperature polymer, with open areas just larger than the electrode size, between aluminum plates. The entire assembly was then hot-pressed at 140° C. and 1.6 MPa for 1 minute on a Carver bench top hydraulic press (No. 3912, Carver Inc., Wabash, Ind., USA).

Example 4

An electrospinning ink was prepared in accordance with the mixing method of Example 1 with 40 wt % platinum on carbon black (HiSpec™ 4000 Pt/C catalyst powder, Johnson Matthey Plc, London, UK) first being mixed with de-ionized water, then with Nafion™ ion exchange resin (D2021 20% ionomer in alcohol/water, DuPont, Wilmington, Del.) with intermittent stirring and sonication. An electrospinning polymer solution comprising poly(acrylic acid) having an average molecular weight $M_w$ of 450 kDa (Sigma-Aldrich Corp., St. Louis, Mo.) was then added. The weight ratio of Pt/C:Nafion™:PAA in the electrospinning ink was 63:22:15, and the total polymer and catalyst content of the ink suspension was 14 wt %.

Subsequent to the addition of the electrospinning polymer, the ink was stirred on a magnetic stirrer for a total of 4 days. During these 4 days samples were taken at 20 hours, 47 hours, 69 hours and 91 hours of stirring for measuring the viscosity and for nozzle-free electrospinning, with the sample taken at 69 hours also electrospun from a needle (see Example 5 below).

For nozzle-free electrospinning 20 ml of the respective ink sample was poured into the electrospinning bath and spun onto the non-woven substrate using a 4-wire spinning electrode under nominal 40 kV electric field with a distance of 100 cm between the surface of the electrospinning bath and the substrate. It was not possible to obtain any fibers from the samples taken at 20 hours and 47 hours of stirring. Only a very small amount of fibers could be obtained from the samples taken at 69 hours and 91 hours due to burning of fibers during the electrospinning process.

Example 5

For electrospinning from a needle the ink sample of Example 4 taken at 69 hours of stirring was also electrospun in a NS LAB 200 S electrospinning apparatus (Elmarco s.r.o. Liberec, CZ) that had been retrofitted with a syringe pump (Fischer Scientific, Waltham, Mass.) and a metallic needle for spinning. The potential difference between the metallic needle and the collecting electrode was about 17.0 kV and the spinneret-to-collector distance and ink flow rate were about 10 cm and 0.6 ml/h, respectively. The collecting substrate used was a smooth non-woven substrate purchased from Hirose Paper Manufacturing Co., Ltd, Tosa-City, Kochi, Japan, part number # HOP-60HCF. FIG. 1 shows a SEM image of the electrospun fibers collected. As seen in the figure, smooth, evenly decorated nanofibers were obtained, proving that the ink was successfully scaled to larger volume.

Example 6

An electrospinning ink was prepared as described in Example 4 with the difference that the total polymer and catalyst content of the ink suspension was reduced to about 8 wt %.

A hydrophobized carbon paper gas diffusion layer with a microporous coating (Sigracet 25BC with an average thickness of 235 µm and an average area weight of 86 g/m², SGL Group, Wiesbaden, Germany) was cut to 5 cm² and mounted onto a smooth nonwoven substrate (part number # HOP-60HCF, Hirose Paper Manufacturing Co., Ltd, Tosa-City, Kochi, Japan).

Figure 2:
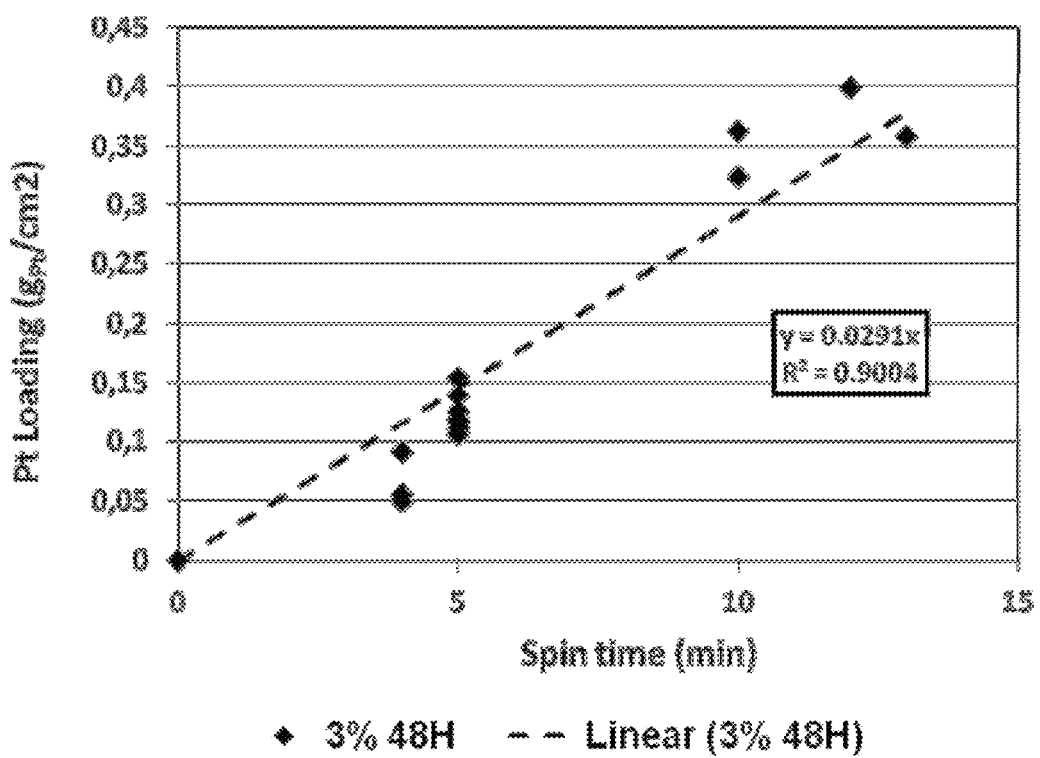
FIG. 2 shows the platinum loading of the electrospun fibrous mat of Example 6 as a function of spinning time.

For nozzle-free electrospinning 20 ml of the electrospinning ink were poured into the electrospinning bath and spun onto the non-woven substrate using a 4-wire spinning electrode under nominal 40 kV electric field with a distance of 100 cm between the surface of the electrospinning bath and the substrate. It was possible to produce nanofibers without fiber burning. The platinum loading of the electrospun fibrous mat on the electrode was adjusted by the duration of the electrospinning and calculated from the total weight of the electrospun fibrous mat, as is described in the test methods above. FIG. 2 shows the loading of platinum on the electrospun fibrous mat as a function of the spinning time.

Example 7

Figure 3:
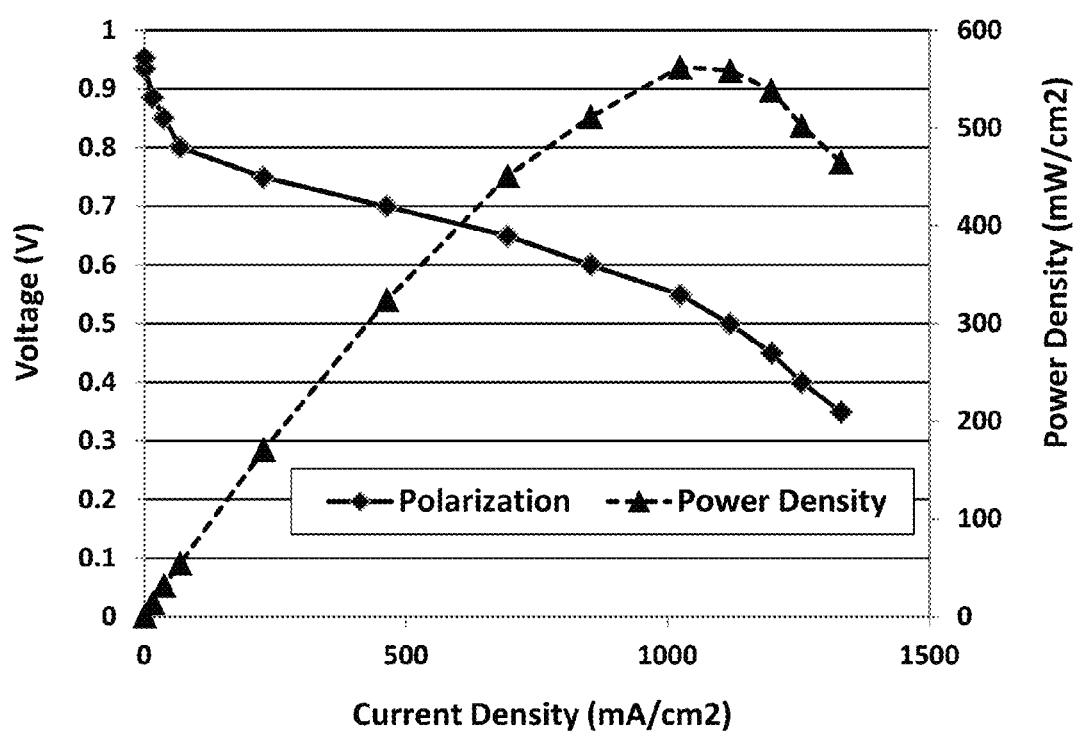
FIG. 3 shows the polarization of the hydrogen/air fuel cell of Example 7.

A membrane electrode assembly was produced in accordance with the general method of Example 3 above using two electrospun fibrous mats of Example 6 as electrodes. Calculated platinum loadings were 0.109 $mg_{Pt}/cm^2$ for the anode and 0.101 $mg_{Pt}/cm^2$ for the cathode. Performance data for the membrane electrode assembly was collected in a hydrogen/air fuel cell at 80° C. and 100% relative humidity without any backpressure. FIG. 3 shows a graph of hydrogen/air fuel cell polarization for the membrane electrode assembly produced from the ink prepared in Example 6, i.e. with the ink suspension having a total polymer and catalyst content of about 8 wt %. As shown the membrane electrode assembly delivered about 695 mA/cm² at 0.65 V with a maximum power density of above 560 mW/cm².

The present examples give evidence that the present process allows for an up-scaling of the production of electrospun fibrous mats which in general terms comprise a metal supported on a carrier, and more particularly platinum on carbon, thereby leading to a reduction in the manufacturing time for the electrodes of membrane electrode assemblies as they are used for example in fuel cells. The results also show that the performance of fuel cells produced in accordance with the present process is comparable to that of fuel cells comprising electrodes with needle-electrospun fibrous mats. Without wishing to be bound by theory, the similarity in performance seems to us an indication that the morphologies of the electrospun nanofibers produced in accordance with the present process and of needle-electrospun nanofibers can basically be considered very similar. It is, however, noted that membrane electrode assemblies produced in accordance with the present invention show improved stability in respective stability tests for fuel cells, such as for example the FCCJ test.

The invention claimed is:

1. A process of producing an electrospun fibrous mat, said process comprising the steps of
   (a) preparing an electrospinning ink comprising metal supported on a carrier, an ionomer, an electrospinning polymer and a solvent by mixing; and
   (b) electrospinning in electrospinning equipment said electrospinning ink to obtain the electrospun fibrous mat,
   wherein step (b) is performed by nozzle-free electrospinning.

2. The process of claim 1, wherein the metal is selected from the group consisting of Sc, Y, Ti, Zr, Hf, V, Nb, Ta, Cr, Mo, W, Fe, Ru, Os, Co, Rh, Ir, Ni, Pd, Pt, Cu, Ag, Au, Zn, Cd, Hg, lanthanides, actinides and any blend thereof.

3. The process according to claim 1, wherein the carrier is selected from the group consisting of carbon, silica, metal oxides, metal halides and any blend thereof.

4. The process according to claim 1, wherein the mixing in step (a) is performed by sonication, stirring, ball milling, homogenization or a combination of all.

5. The process according to claim 1, wherein the ionomer comprises electrically neutral repeating units and ionized or ionizable repeating units.

6. The process according to claim 1, wherein the solvent is selected from the group consisting of water, alcohols, ketones, ethers, amides and any blend thereof.

7. The process according to claim 1, wherein the electrospinning equipment comprises two electrodes, the distance between which is at least 0.01 m and at most 2 m.

8. The process according to claim 1, wherein the electrospinning is performed with an applied voltage of at least 1.0 kV and of at most 200 kV.

9. The process according to claim 1, wherein the electrospinning ink comprises at least 1 wt % and at most 30 wt % of the combined amounts of metal with carrier, ionomer and electrospinning polymer, with wt % being relative to the total weight of the electrospinning ink.

10. The process according to claim 1, wherein the electrospinning ink comprises at least 1 wt % and at most 15 wt % of the combined amounts of metal with carrier, ionomer and electrospinning polymer, with wt % being relative to the total weight of the electrospinning ink.

11. The process according to claim 1, wherein the electrospinning ink comprises at least 1 wt % and at most 12 wt % of the combined amounts of metal with carrier, ionomer and electrospinning polymer, with wt % being relative to the total weight of the electrospinning ink.

12. The process according to claim 1, wherein the electrospinning ink comprises the metal with carrier, the ionomer and the electrospinning polymer in a ratio of A : B : C with A being at least 10 parts and at most 80 parts, B being at least 1 part and at most 40 parts and C being at most 50 parts, with the sum of A, B and C being 100 parts, with parts being given as weight parts.

13. The process according to claim 1, wherein the process further comprises the step of
   (c) using said electrospun fibrous mat as anode or cathode or both in a membrane electrode assembly.

14. An electrospun fibrous mat obtained by the process of claim 1.

15. A membrane electrode assembly comprising the electrospun fibrous mat of claim 14.

16. A fuel cell comprising the membrane electrode assembly of claim 15.

* * * * *